United States Patent [19]

McNicol et al.

[11] 4,081,409

[45] Mar. 28, 1978

[54] METHOD FOR PREPARING FUEL CELL CATALYSTS

[75] Inventors: Brian D. McNicol; Richard T. Short, both of Chester, England

[73] Assignee: Shell Oil Company, Houston, Tex.

[21] Appl. No.: 763,387

[22] Filed: Jan. 28, 1977

[30] Foreign Application Priority Data

Feb. 20, 1976 United Kingdom ............... 6869/76

[51] Int. Cl.$^2$ .................. B01J 23/62; B01J 23/64; B01J 23/82; B01J 23/84
[52] U.S. Cl. ................ 252/472; 252/466 J; 252/466 PT
[58] Field of Search ............... 252/472, 425.3, 466 J, 252/466 PT

[56] References Cited

U.S. PATENT DOCUMENTS

| | | | |
|---|---|---|---|
| 3,167,457 | 1/1965 | Bacon et al. | 252/425.3 |
| 3,287,171 | 11/1966 | Holt | 252/472 X |
| 3,505,118 | 4/1970 | Mehra et al. | 252/472 X |

*Primary Examiner*—W. J. Shine
*Attorney, Agent, or Firm*—Ronald R. Reper

[57] ABSTRACT

A catalyst for a fuel cell electrode having improved activity is prepared by covering a Group VIII transition metal with oxygen during or before immersion in a liquid containing a compound of a co-catalyst.

7 Claims, No Drawings

METHOD FOR PREPARING FUEL CELL CATALYSTS

BACKGROUND OF THE INVENTION

1. Field of the Invention

This invention relates to a method for the preparation of a catalyst suitable for fuel cell electrodes, to a catalyst thus prepared, to a fuel cell electrode comprising this catalyst and to a fuel cell comprising this electrode.

2. Description of the Prior Art

Netherlands patent application No. 7,501,816 relates to the preparation of a catalyst, suitable for fuel cell electrodes, by covering a catalyst metal being a transition metal of the eighth group of the periodic table with hydrogen and then immersing in a solution of a compound of a co-catalyst. In this way, an improved electrocatalytic activity, in particular for the electrochemical oxidation of compounds, such as methanol, formaldehyde and formic acid can be obtained.

It has now surprisingly been found that covering the catalyst metal with oxygen prior to immersion results in an improved electrocatalytic activity as well.

SUMMARY OF THE INVENTION

This invention, therefore, relates to a method for the preparation of a catalyst, suitable for fuel cell electrodes, which catalyst comprises as catalyst metal a transition metal of Group VIII of the Periodic Table and co-catalyst, which method comprises covering the catalyst metal with oxygen before or during immersion in a liquid containing a compound of the co-catalyst and thereafter separating the catalyst from the liquid.

DESCRIPTION OF THE PREFERRED EMBODIMENTS

According to the invention, the catalyst for a fuel cell electrode comprises a transition metal of Group VIII of the Periodic Table. The Periodic Table herein refers to the Periodic Table of Elements appearing in the fly leaf of Perry's Chemical Engineers Handbook, McGraw-Hill, fourth ed., 1963.

Suitable catalysts are platinum, palladium, rhodium, iridium, osmium, ruthenium, nickel and particularly platinum.

Suitable co-catalysts are tin, lead, arsenic, antimony, bismuth, rhenium, thallium, tantalum and titanium. The co-catalysts may be in the form of these metals and/or their oxides or hydroxides. Other suitable co-catalysts are mentioned in the above-indicated Netherlands application. Tin is particularly suitable as co-catalyst.

Although the catalyst metal can be deposited directly onto an electrically conductive substrate by electrodeposition, according to the present invention and in particular in the case of tin as co-catalyst, catalyst metals with a higher surface area, e.g., higher than 20 m$^2$/g catalyst metal, are preferred. Suitable types hereof are catalyst metals applied to an electrically conductive substrate as finely divided metallic powder, obtained by reduction of the catalyst metal oxide with hydrogen, by using a binder (Adams catalysts). Furthermore, the catalyst metals can be deposited onto an electrically conductive support, such as carbon, by impregnation followed by chemical or electrochemical reduction (supported catalyst). In particular, Adams platinum having a surface area of about 100 m$^2$/g Pt is a preferred catalyst metal.

The catalyst metal can be covered with oxygen by any suitable means, such as by electrochemical adsorption in the oxygen chemisorption or evolution region, i.e., for pure Pt at a potential of at least 0.5V, preferably at least 0.8V, versus that of the reversible hydrogen electrode (RHE). This covering may be preceded by a cleaning treatment of the finely divided catalyst metal by alternative oxidation and reduction of the surface, e.g., in the case of pure Pt by potential cycling between 0.0 and 1.6V vs. RHE in, e.g., 3 molar $H_2SO_4$.

The oxygen covering may be followed by washing the finely divided catalyst metal with distilled water.

The immersion is carried out in a liquid being a compound of the co-catalyst, such as stannic chloride or a liquid containing a compound of the co-catalyst such as an aqueous solution of stannic chloride or an aqueous tin oxide/potassium by dioxide solution.

It is also possible to immerse the catalyst metal in an acid solution of the co-catalyst, e.g., a solution in 3–8 sulfuric acid and then setting the potential at least 0.5V so that oxygen covering takes place, immediately followed by adsorption of the co-catalyst.

The catalytic activity of the catalysts thus prepared can be estimated by measuring polarization curves in 1 molar methanol/3 molar sulfuric acid at a temperature in the range of about 60°–80° C. The catalytic activity is defined as the current flowing in at a particular potential (vs. RHE at 25° C) per mg of catalyst metal in the catalyst (specific activity).

EXAMPLES

1. A platinum Adams catalyst, prepared by spraying a mixture of platinum and 1% w low density polyethylene powder in carbon tetrachloride solution on to gold foil, was cleaned by potential cycling between 0 and 1.6V (vs. RHE) in 3 molar sulfuric acid. The cycling was stopped at 0.6 volts and the catalyst washed in distilled water, damp-dried and immersed in anhydrous stannic chloride for 15 minutes. After removal from this solution and washing with distilled water the specific activity at 0.4V was then measured in a medium of 3 molar sulfuric acid/1molar methanol at 80° C and found to be 20 A/g, some fifty times higher than that of the pure untreated platinum Adams catalyst.

2. The catalyst of example 1 was cleaned by potential cycling between 0 and 1.6V (vs. RHE) in 3 molar sulfuric acid. The cycling was stopped at 1.1 volts and the catalyst washed with distilled water, dampdried and immersed in anhydrous stannic chloride for 15 minutes. After removal, and washing with distilled water, specific activity at 0.4V was measured in a medium of 3 molar sulfuric acid/1 molar methanol at 80° C and was found to be 20 A/g, some fifty times higher than that of the pure untreated platinum Adams catalyst.

3. The catalyst of example 1 was cleaned by cycling between 0 and 1.6V (vs. RHE) in 3 molar sulfuric acid. The cycling was stopped at 1.6V and the catalyst washed with distilled water, damp-dried and immersed in anhydrous stannic chloride for 15 minutes. After removal and washing with distilled water, the specific activity at 0.4V was then measured in a medium of 3 molar sulfuric acid/1 molar methanol at 60° C and found to be 5.6 A/g, some fifty times more active than the pure untreated platinum Adams catalyst.

4. The catalyst of example 1 was pretreated as described in example 2 but then was immersed for 15 minutes in an aqueous solution. After removal from this solution and washing with distilled water, the specific activity at 0.4V was measured in a medium of 3 molar sulfuric acid/1 molar methanol at 60° C and found to be 6 A/g, some sixty times more active than the pure untreated platinum Adams catalyst.

5. The catalyst of example 1 was pretreated as described in example 2 but then was immersed for 15 minutes in warm stannous oxide/potassium hydroxide solution. After removal from this solution and washing with distilled water, the specific activity at 0.4V was measured in 3 molar $H_2SO_4$/1 molar $CH_3OH$ at 60° C and found to be 3.5 A/g, some 35 times more active than the pure untreated platinum Adams catalyst.

What is claimed is:

1. Method for the preparation of a catalyst, suitable for fuel cell electrodes, which catalyst comprises as catalyst metal a transition metal of the Group VIII of the Periodic Table and a co-catalyst selected from the group consisting of tin, lead, arsenic, antimony, bismuth, rhenium, thallium, tantalum and titanium which method comprises covering the catalyst metal with oxygen before or during immersion in a liquid compound of the co-catalyst or a solution of a compound of the co-catalyst, said compound being selected from the group consisting of oxides, hydroxides and compounds convertible to oxides or hydroxides under electrochemical oxidation conditions, and thereafter separating the catalyst from said liquid or said solution.

2. Method according to claim 1, wherein the catalyst metal has a surface area higher than 20 $m^2$/g catalyst metal.

3. Method according to claim 1, wherein said catalyst metal is supported.

4. Method according to claim 1, wherein said catalyst metal is Pt and said cocatalyst is Sn.

5. Method according to claim 1, wherein said catalyst metal is covered with oxygen by electrochemical adsorption at a potential of at least 0.5V.

6. Method according to claim 5, wherein said potential is at least 0.8V.

7. Method according to claim 1, wherein in the immersion step said catalyst metal is immersed in anhydrous $SnCl_4$.

* * * * *